(12) United States Patent
Zettel et al.

(10) Patent No.: US 10,124,679 B2
(45) Date of Patent: Nov. 13, 2018

(54) METHOD AND APPARATUS FOR RECHARGING AN ENERGY STORAGE DEVICE ON A VEHICLE

(71) Applicant: GM GLOBAL TECHNOLOGY OPERATIONS LLC, Detroit, MI (US)

(72) Inventors: Andrew M. Zettel, Port Moody (CA); Larry T. Nitz, South Lyon, MI (US); Andrew J. Farah, Troy, MI (US); Matthew S. Stout, Hartland, MI (US); Daniel P. Grenn, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 249 days.

(21) Appl. No.: 14/928,283

(22) Filed: Oct. 30, 2015

(65) Prior Publication Data

US 2017/0120762 A1    May 4, 2017

(51) Int. Cl.
*B60L 11/18*    (2006.01)
*B60L 7/10*    (2006.01)
*B60L 7/14*    (2006.01)
*B60L 11/14*    (2006.01)

(52) U.S. Cl.
CPC ............ *B60L 11/1809* (2013.01); *B60L 7/10* (2013.01); *B60L 7/14* (2013.01); *B60L 11/14* (2013.01); *B60L 11/1861* (2013.01); *B60L 2240/60* (2013.01); *B60L 2240/622* (2013.01); *B60L 2240/642* (2013.01); *B60L 2260/50* (2013.01); *B60L 2260/54* (2013.01); *Y02T 10/70* (2013.01); *Y02T 10/7077* (2013.01); *Y02T 10/7291* (2013.01); *Y02T 90/16* (2013.01); *Y02T 90/162* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,349,535 | A * | 9/1994 | Gupta | B60L 11/1818 320/106 |
| 5,778,326 | A * | 7/1998 | Moroto | B60K 6/485 701/22 |
| 8,063,609 | B2 * | 11/2011 | Salasoo | B60L 3/0046 320/103 |
| 9,266,443 | B2 * | 2/2016 | Payne | B60L 11/1861 |

(Continued)

FOREIGN PATENT DOCUMENTS

| | | |
|---|---|---|
| CN | 101249829 A | 8/2008 |
| CN | 101356707 A | 1/2009 |

*Primary Examiner* — Redhwan K Mawari
(74) *Attorney, Agent, or Firm* — Quinn IP Law (57) ABSTRACT

A vehicle including an energy storage device and a powertrain system configured to effect regenerative braking is described. A method for controlling the vehicle includes determining an expected increase in a state of charge of the energy storage device achieved through opportunity charging by employing regenerative braking during an anticipated next trip of the vehicle. A preferred setpoint for the state of charge of the energy storage device is determined based upon the expected increase in the state of charge achieved through opportunity charging, and charging of the energy storage device is controlled during a remote charging event based upon the preferred setpoint for the state of charge of the energy storage device.

8 Claims, 3 Drawing Sheets

(56) References Cited

U.S. PATENT DOCUMENTS

2008/0183348 A1 7/2008 Arita et al.
2013/0179007 A1* 7/2013 Dalum ................ H01M 16/006
701/2

* cited by examiner

METHOD AND APPARATUS FOR RECHARGING AN ENERGY STORAGE DEVICE ON A VEHICLE

TECHNICAL FIELD

The present disclosure relates to vehicles employing non-combustion torque machines and rechargeable energy storage devices, and control thereof.

BACKGROUND

On-board energy storage devices supplying power to non-combustion torque machines may be recharged via on-vehicle power systems, e.g., combustion engines, and via remote power systems when a vehicle is stationary. There are time and financial costs for recharging of an on-board energy storage device when a vehicle is stationary. A vehicle that has an expected travel route after charging may want to limit the amount of recharging of the on-board energy storage device because of upcoming opportunities to recharge the on-board energy storage device via opportunity charging while traversing the expected travel route.

SUMMARY

A vehicle including an energy storage device and a powertrain system configured to effect regenerative braking is described. A method for controlling the vehicle includes determining an expected increase in a state of charge of the energy storage device achieved through opportunity charging by employing regenerative braking during an anticipated next trip of the vehicle. A preferred setpoint for the state of charge of the energy storage device is determined based upon the expected increase in the state of charge achieved through opportunity charging, and charging of the energy storage device is controlled during a remote charging event based upon the preferred setpoint for the state of charge of the energy storage device.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The concepts described herein apply to any vehicle powertrain system that includes a non-combustion torque machine that is configured to effect regenerative braking to recharge an on-board energy storage device during vehicle operation, wherein the on-board energy storage device may be recharged via a remote, off-board charging system when the vehicle is stationary. This includes, by way of non-limiting examples, plug-in hybrid vehicles, electric vehicles and non-plug-in hybrid vehicles. The on-board energy storage device and associated non-combustion torque machine are described as devices that store and consume electric power to generate propulsion power, but the concepts described herein are not so limited, and may be applied to devices that store and consume hydraulic power or pneumatic power to generate propulsion power.

Figure 1:
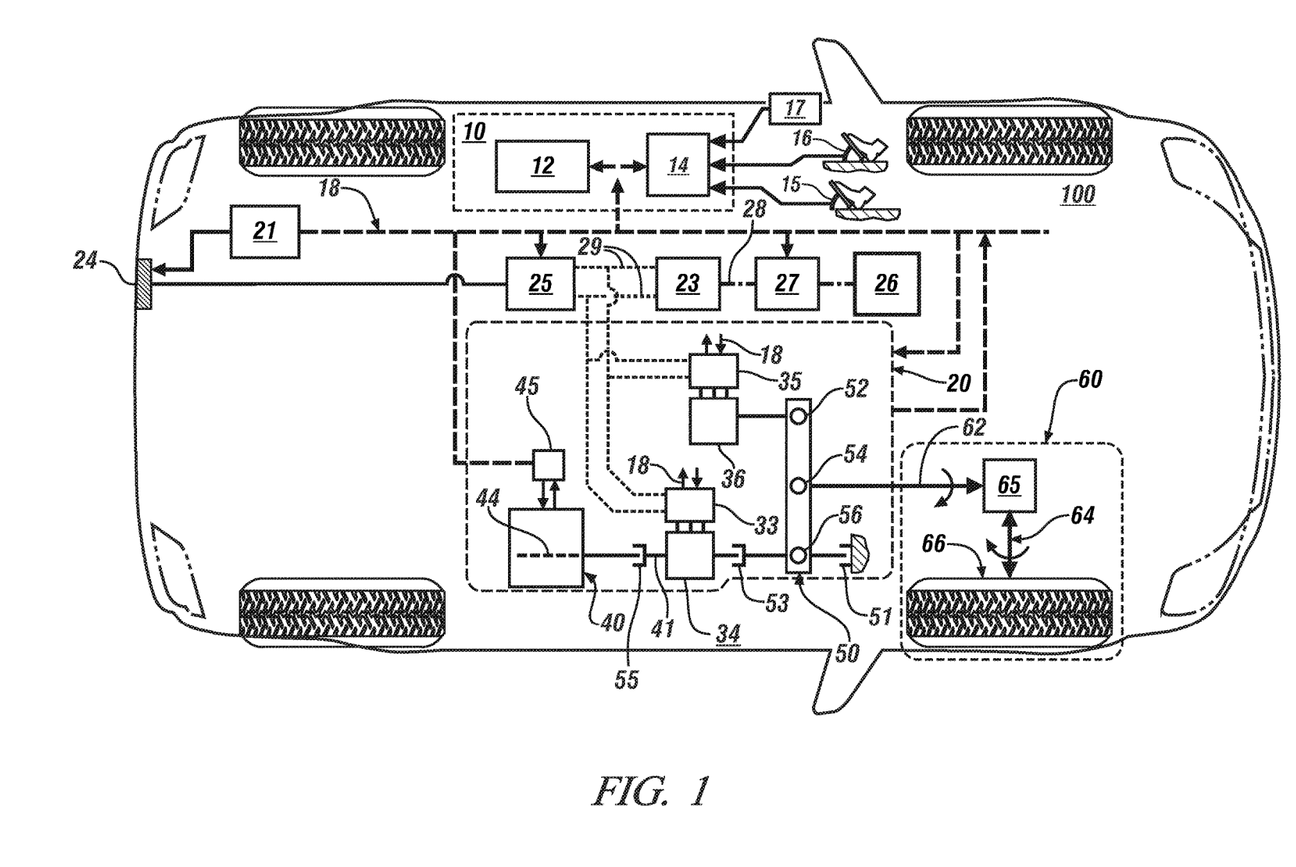
FIG. 1 schematically shows an embodiment of a vehicle including a multi-mode powertrain system coupled to a driveline, wherein a rechargeable on-board energy storage device supplies energy to generate the propulsion power, in accordance with the disclosure.

Referring now to the drawings, wherein the showings are for the purpose of illustrating certain exemplary embodiments only and not for the purpose of limiting the same, FIG. 1 schematically shows an embodiment of a vehicle 100 including a multi-mode powertrain system 20 coupled to a driveline 60 and controlled by a control system 10, wherein a rechargeable on-board high-voltage energy storage device (battery) 25 supplies energy to generate at least a portion of the propulsion power. In certain embodiments, the battery 25 may electrically connect via an on-vehicle battery charger 24 to a remote, off-vehicle electric power source for charging while the vehicle 100 is stationary. Other embodiments of a vehicle system that includes a rechargeable on-board energy storage device that supplies power to a non-combustion torque machine of a powertrain system to generate propulsion torque, wherein the powertrain system is configured to effect regenerative braking may be employed within the scope of this disclosure. Like numerals refer to like elements throughout the description.

The powertrain system 20 includes multiple torque-generating devices including an internal combustion engine (engine) 40 and first and second electrically-powered torque machines (electric machines) 34, 36, respectively, that rotatably couple a gear train 50. An output member 62 mechanically couples between the gear train 50 and a driveline 60. Thus, the engine 40 and the first and second electric machines 34, 36 couple to the gear train 50 and are controllable to generate propulsion power that is transferred to the driveline 60 as propulsion torque for the vehicle 100 in response to an output torque request. Furthermore, either or both of the first and second electric machines 34, 36 are controllable to react driveline torque and thus generate braking torque for the vehicle 100 in response to a braking request.

One embodiment of the internal combustion engine 40 and the first and second electric machines 34, 36 that couple to the gear train 50 and generate output torque that is transferred to the driveline 60 to generate propulsion torque is now described. A crankshaft 44 of the internal combustion engine 40 couples to an input member 41 that couples to a rotor of the first electric machine 34 via a third clutch 55. An output member from the rotor of the first electric machine 34 couples via a second clutch 53 to a ring gear 56 of the gear train 50. The second electric machine 36 rotatably couples to a sun gear 52 of the gear train 50. A planet gear carrier 54 of the gear train 50 couples via the output member 62 to the driveline 60. The ring gear 56 is couplable via a first clutch/brake 51 to a chassis ground. In one embodiment, the gear train 50 is a simple planetary gear set including sun gear 52, planet gear and carrier 54, and ring gear 56. A transmission control module (TCM) (not shown) monitors rotational speeds of various rotating members and controls activations of the first, second and third clutches 51, 53 and 55.

The engine 40 is preferably a multi-cylinder internal combustion engine that converts hydrocarbon-based fuel or another fuel to mechanical torque through a thermodynamic combustion process. The engine 40 is equipped with a plurality of actuators and sensing devices for monitoring operation and delivering fuel to form in-cylinder combustion charges that generate an expansion force that is transferred via pistons and connecting rods to the crankshaft 44 to produce torque. Operation of the engine 40 is controlled by an engine control module (ECM) 45. The engine 40 may be configured to execute autostart and autostop control routines, fuel cutoff (FCO) control routines and cylinder deactivation control routines during ongoing operation of the powertrain system 20. The engine 40 is considered to be in an OFF state when it is not rotating. The engine 40 is considered to be in an ON state when it is rotating, including one or more FCO states in which it is spinning and unfueled.

The first and second electric machines 34, 36 are preferably high-voltage multi-phase electric motor/generators that electrically connect to the battery 25 via first and second inverter modules 33, 35, respectively. The first and second electric machines 34, 36 are configured to convert stored electric energy to mechanical power and convert mechanical power to electric energy that may be stored in the battery 25. The battery 25 may be any high-voltage energy storage device, e.g., a multi-cell lithium ion device, an ultracapacitor, or another suitable device without limitation. The battery 25 may be characterized in terms of its energy capacity, e.g., state of charge (SOC), which may be expressed in terms of Amp-hours (Ah) or percentage of a maximum charge (%). Determination of energy capacity, e.g., SOC, for a battery or another energy storage device is known to those skilled in the art and not described in detail herein. In one embodiment, the battery 25 may electrically connect via the on-vehicle battery charger 24 to a remote, off-vehicle electric power source for charging while the vehicle 100 is stationary, with the on-vehicle battery charger 24 controlled by a charger controller 21. The battery 25 electrically connects to the first inverter module 33 via the high-voltage DC bus 29 to transfer high-voltage DC electric power to the first electric machine 34 in response to control signals originating in the control system 10. Likewise, the battery 25 electrically connects to the second inverter module 35 via the high-voltage DC bus 29 to transfer high-voltage DC electric power to the second electric machine 36 in response to control signals originating in the control system 10. The remote, off-vehicle electric power source may be any public/commercial power source or private power source, such as a residential power source.

Each of the first and second electric machines 34, 36 includes the rotor and a stator, and electrically connects to the high-voltage battery 25 via the corresponding first and second inverter circuits 33, 35, respectively, and the high-voltage DC bus 29. The first and second inverter modules 33, 35 are both configured with suitable control circuits including power transistors, e.g., IGBTs for transforming high-voltage DC electric power to high-voltage AC electric power and transforming high-voltage AC electric power to high-voltage DC electric power. Each of the first and second inverter modules 33, 35 preferably employs pulsewidth-modulating (PWM) control to convert stored DC electric power originating in the high-voltage battery 25 to AC electric power to drive the respective first and second electric machines 34, 36 to generate torque. Similarly, each of the first and second inverter modules 33, 35 converts mechanical power transferred to the respective first and second electric machines 34, 36 to DC electric power to generate electric energy that is storable in the battery 25, including as part of a regenerative power control strategy. The first and second inverter modules 33, 35 are both configured to receive motor control commands and control inverter states to provide the motor drive and regenerative braking operations through the first and second electric machine 34, 36. In one embodiment, a DC/DC electric power converter 23 electrically connects to a low-voltage bus 28 and a low-voltage battery 27, and electrically connects to the high-voltage DC bus 29. Such electric power connections are known and not described in detail. The low-voltage battery 27 electrically connects to an auxiliary power system 26 to provide low-voltage electric power to low-voltage systems on the vehicle, including, e.g., electric windows, HVAC fans, seats and other devices.

The driveline 60 may include a differential gear device 65 that mechanically couples to an axle, transaxle or half-shaft 64 that mechanically couples to a wheel 66 in one embodiment. The driveline 60 transfers propulsion torque between the gear train 50 and a road surface.

An operator interface 14 of the vehicle 100 includes a controller 12 that signally connects to a plurality of human/machine interface devices through which the operator commands operation of the vehicle 100. The human/machine interface devices preferably include, e.g., an accelerator pedal 15, a brake pedal 16 and a user interface such as a graphical user interface (UI) 17. Other human/machine interface devices may include an ignition switch to enable an operator to operate the vehicle 100, a steering wheel, a transmission range selector and a headlamp switch. The accelerator pedal 15 provides signal input indicating an accelerator pedal position and the brake pedal 16 provides signal input indicating a brake pedal position. The accelerator pedal position corresponds to an operator request for propulsion torque, which may be generated by one or more of the first and second electric machines 34, 36 and the engine 40. The brake pedal position corresponds to an operator request for braking torque, which may be generated by one of the first and second electric machines 34, 36 and the wheel brakes. In certain embodiments, a navigation system with on-vehicle GPS is employed on the vehicle 100. The UI 17 may include a visual operating display on a monitor through which the operator directs operation of various vehicle systems, such as infotainment systems, HVAC systems, navigation systems (on vehicles so equipped) and the like. The UI 17 is situated on a center console or elsewhere in the passenger compartment that is readily accessible to the operator.

The control system 10 includes a controller 12 that signally connects to the operator interface 14. The controller 12 preferably includes a plurality of discrete devices that are co-located with the individual elements of the powertrain system 20 to effect operational control of the individual elements of the powertrain system 20 in response to operator commands and powertrain demands. The controller 12 may also include a control device that provides hierarchical control of other control devices. The controller 12 communicatively connects to each of the high-voltage battery 25, the first and second inverter modules 33, 35, the ECM 45 the TCM, and the charger controller 21, either directly or via a communication bus 18 to monitor and control operation thereof.

The controller 12 commands operation of the powertrain system 20, including selecting and commanding operation in one of a plurality of operating modes to generate and transfer torque between the torque generative devices, e.g., the engine 40 and the first and second electric machines 34, 36 and the driveline 60. The operating modes preferably include one or more electric-vehicle (EV) modes wherein the engine 40 is in the OFF state and the first and/or the second electric machines 34, 36 generate propulsion torque. The operating modes preferably also include an electrically-variable mode wherein the engine 40 and one or both of the first and second electric machines 34, 36 generate propulsion torque. The operating modes preferably also include an extended-range EV mode wherein the engine 40 is in the ON state and generating electric power through the first electric machine 34 and the second electric machine 36 is generating propulsion torque. The extended-range EV mode, the EV mode and the electrically-variable mode each have an associated battery charging mode that may be either a charge-sustaining mode or a charge-depleting mode. The charge-depleting mode may include operating with the engine 40 in the OFF state, and the charge-sustaining mode may include operating with the engine 40 in the ON state. The charge-sustaining mode indicates powertrain operation wherein a state of charge (SOC) of the battery 25 is preferably maintained at a predetermined level with a possibility of short-term variations associated with vehicle operation. The charge-depleting mode indicates powertrain operation wherein SOC of the battery 25 is preferably depleted at a predetermined rate, with a possibility of short-term variations associated with vehicle operation.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, for example each 100 microseconds or 3.125, 6.25, 12.5, 25 and 100 milliseconds during ongoing operation. Alternatively, routines may be executed in response to occurrence of a triggering event.

The powertrain system 20 includes a communication scheme including the communication bus 18 to effect communication in the form of sensor signals and actuator command signals between the control system 10, the vehicle 100 and the powertrain system 20. The communication scheme employs one or more communication systems and devices, including, e.g., the communication bus 18, a direct connection, a local area network bus, a serial peripheral interface bus, and wireless communication to effect information transfer. Communication between controllers, and communication between controllers, actuators and/or sensors may be accomplished using a direct wired link, a networked communication bus link, a wireless link or another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

There may be a preference to charge the battery 25 of an embodiment of the vehicle 100 to a SOC that is less than a maximum SOC value. This preference to incompletely charge the battery 25 may be due to anticipation that the vehicle 100 may undergo opportunity charging of the battery 25 through regenerative braking that may occur during a subsequent trip in the vehicle 100, possibly due to location of the vehicle 100 and its anticipated route. Thus there may be an expected increase in the SOC that is achieved through opportunity charging of the battery 25 during the subsequent trip. Opportunity charging includes any vehicle operation wherein energy associated with vehicle momentum may be converted to electrical power by reactive operation of the first and/or second electric machines 34, 36 to the driveline 60, such as regenerative braking. Such opportunity charging of the battery 25 associated with regenerative braking may include, by way of a non-limiting example, a situation wherein, during a subsequent trip, the vehicle 100 traverses an anticipated route that includes a downhill grade with regenerative braking after being parked on or near a hill.

As described in detail with reference to FIGS. 2 and 3, methods for controlling the SOC of the battery 25 may include selecting a preferred setpoint for the SOC during a charging event based upon an expected increase in the state of charge achieved through opportunity charging of the battery 25 during a subsequent trip. Furthermore, the controller 12 may control charging of the battery 25 during the present trip based upon the preferred setpoint for the SOC of the battery 25. As employed herein, the term 'charging event' refers to charging of an on-vehicle battery using power originating from a remote, off-board charging system when the vehicle is stationary.

Figure 2:
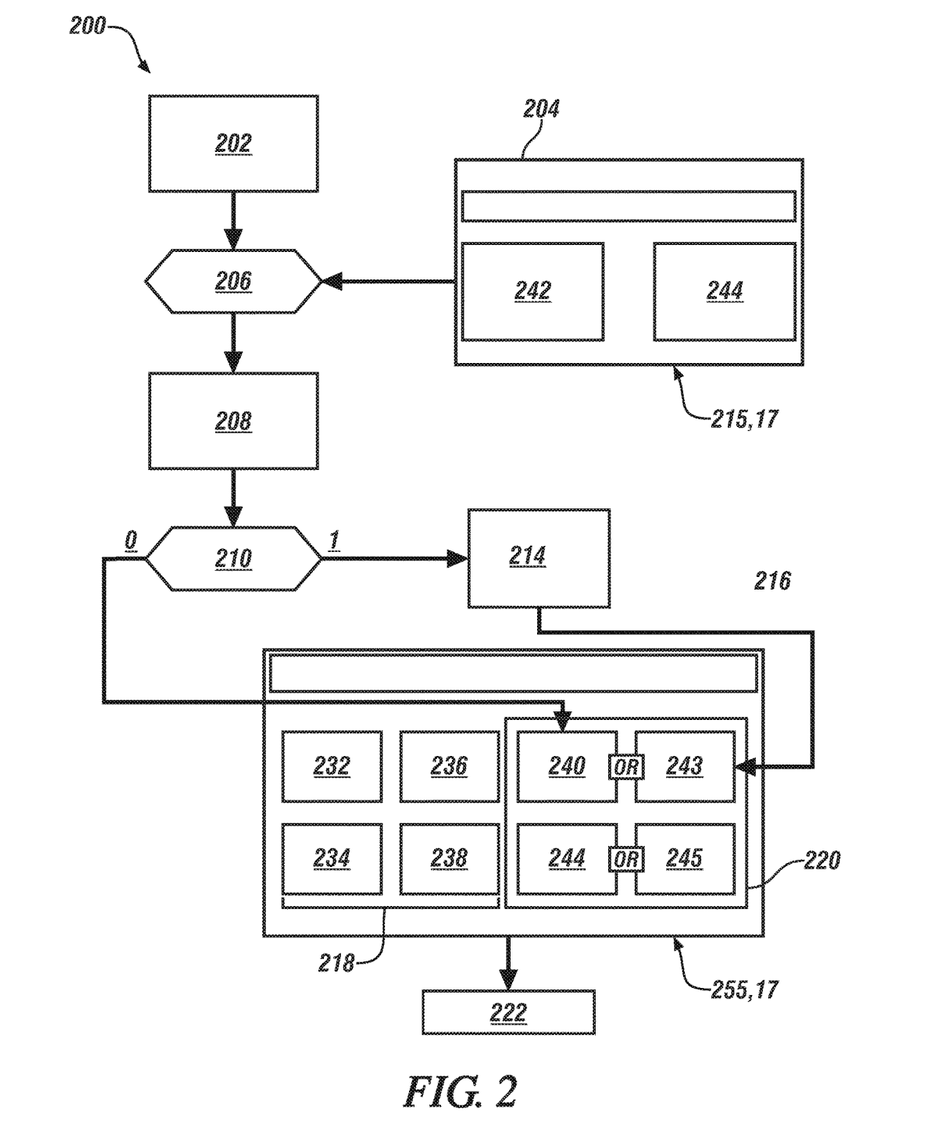
FIGS. 2 and 3 schematically show embodiments of charging management routines to control a charging event of the energy storage device of an embodiment of the vehicle described with reference to FIG. 1 using power originating from a remote, off-board charging system when the vehicle is stationary when the on-board energy storage device may be recharged during subsequent vehicle operation, in accordance with the disclosure.

FIG. 2 schematically shows a first battery charging management routine (routine) 200 that may be executed to control a charging event for a vehicle that includes an enhanced navigation system. One embodiment of such a vehicle is described with reference to FIG. 1. This routine 200 may be advantageously employed on various vehicle systems that employ high-voltage electrical systems to generate propulsion torque. The routine 200 may be applied to operation of any vehicle including an energy storage device and a powertrain system having regenerative braking capability. This may include a vehicle powertrain system that includes a non-combustion torque machine that consumes energy stored in an on-board energy storage device to generate propulsion torque, wherein the on-board energy storage device may be recharged during subsequent vehicle operation using opportunity charging such as regenerative braking, or recharged during vehicle operation using torque generated by another machine such as an internal combustion engine. Table 1 is provided as a key wherein the numerically labeled blocks and the corresponding functions are set forth as follows, corresponding to the routine 200.

TABLE 1

| BLOCK | BLOCK CONTENTS |
|---|---|
| 202 | Trip completed; Determine vehicle location, battery SOC, ambient conditions |
| 204 | Trip Data Entry - select or otherwise identify destination of an anticipated next trip |
| 206 | Verify Trip Data Entry, vehicle GPS location, battery SOC, ambient conditions |
| 208 | Execute vehicle forward model simulation to estimate SOC at end of the anticipated next trip |
| 210 | Did simulation indicate SOC >100%? |
| 214 | Determine magnitude of overcharging |
| 216 | Adjust charging setpoint based upon magnitude of overcharging |
| 218 | Inform operator via UI |
| 220 | Operator selects reduced charge SOC setpoint |
| 222 | Commence vehicle charging |

The routine 200 preferably executes after a trip has been completed, which may be indicated by occurrence of a vehicle key-off event, or an input from the vehicle operator. As employed herein, the term 'trip' refers to a single key-on/key-off cycle of vehicle operation. When the trip is completed, the controller 12 captures information from various systems to determine a present geographical location of the vehicle, battery SOC, ambient conditions and other factors associated with vehicle operation (202). The present geographical location of the vehicle may be determined using the on-board navigation system, or via operator input to the UI 17. The vehicle operator may be prompted by a display screen 215 on the UI 17 to select or otherwise identify a destination of an anticipated next trip (204). A first example display screen 215 on the UI 17 is shown. Identifying the destination of the anticipated next trip via the UI 17 may include selecting a destination from one of a plurality of preset destinations that may be indicated on a pull-down menu 242 on the display screen 215 of the UI 17. Identifying the destination of the anticipated next trip via the display screen 215 of the UI 17 may instead include entering a destination employing the on-vehicle navigation system 244 via the UI 17. The destination of the anticipated next trip and other trip data from step 204 is communicated to the routine 200, which verifies the destination of the anticipated next trip, the present geographical location of the vehicle, and other vehicle-related information including battery SOC, ambient conditions and other factors associated with vehicle operation (206).

When the destination of the anticipated next trip is identified and the present geographical location of the vehicle, battery SOC, ambient conditions and other factors associated with vehicle operation are determined, a vehicle forward model is executed to estimate a battery SOC at the end of the anticipated next trip (208). This may also include estimating the battery SOC during portions of the anticipated next trip. The vehicle forward model preferably is an executable algorithm or set of algorithms that employs expected route information for the anticipated next trip, vehicle data related to power consumption and power recovery through regenerative braking operation to traverse the route of the anticipated next trip, and other factors to estimate the battery SOC at the end of the anticipated next trip. Persons skilled in the art are able to develop simulation models and calibrations to implement a vehicle forward model.

The estimated battery SOC during the anticipated next trip is evaluated to determine whether there is a likelihood of overcharging the battery 25 during the anticipated next trip, including determining whether there is a likelihood of overcharging during a portion of the next trip, wherein charging the battery 25 is effected by regenerative braking operation (210). The battery 25 may be overcharged if the estimated battery SOC is greater than 100% at the end of the anticipated next trip, or if the estimated battery SOC is greater than 100% during a portion of the anticipated next trip. Alternatively, the battery 25 may be overcharged if the estimated battery SOC is greater than a preset magnitude that is less than 100% at the end of the anticipated next trip. The overcharging during a portion of the anticipated next trip may occur, by way of a non-limiting example, due to regenerative braking operation during vehicle operation on a downhill grade during the anticipated next trip.

When there is no likelihood of overcharging the battery 25 during the anticipated next trip or during a portion of the anticipated next trip (210)(0), the routine communicates such information to the operator via the UI 17 (218), and commands the charging controller 21 to commence vehicle charging (222) without further interaction with the operator. This includes a command to the charging controller 21 to charge the battery 25 to an SOC of 100%, i.e., a command to fully charge the battery 25.

When there is a likelihood of overcharging the battery 25 during the anticipated next trip or during a portion of the anticipated next trip (210)(1), the routine 200 determines a magnitude of overcharging (214) and communicates such information to the operator via the UI 17 to adjust a charging setpoint based upon the magnitude of overcharging (216). The routine 200 communicates such information to the operator via the UI 17. Another example display screen 255 on the UI 17 is shown. The routine 200 displays temporal information 218 and charging information 220 on the display screen 255 of the UI 17. The temporal information 218 preferably includes one or a plurality of selectable locations, including, e.g., locations 232 and 234, and associated time-of-day charging configurations 236 and 238. The charging information 220 includes an associated charging configuration, including a first corresponding full charge setpoint 240 and a variable lower charge setpoint 243, and a second corresponding full charge setpoint 244 and a fixed lower charge setpoint 245. Thus, the UI 17 queries the operator whether to fully charge the battery, reduce the SOC setpoint by a fixed value, or reduce the SOC setpoint by an operator-selectable value. In response to selected entries by the operator, the routine 200 commences a charging event to effect vehicle charging with the command to the charging controller 21 to charge the battery 25 to an SOC that reflects the SOC setpoint, which may include the full charge SOC setpoint, the fixed reduced charge SOC setpoint, or the variable reduced charge SOC setpoint (222).

The routine 200 employs information from various on-vehicle and off-vehicle systems, such as a navigation system, to decide whether to modify the SOC setpoint for a charging event prior to an anticipated next trip. The routine 200 evaluates a near-term probability of driving the vehicle on a downhill grade, e.g., as indicated by the operator or the navigation system, and estimates, using a vehicle forward model whether the grade would result in saturating and/or overcharging of the battery 25 due to battery charging associated with regenerative braking, including accounting for estimated accessory loads. If the routine 200 predicts likelihood of saturation of the battery 25, the driver may have the option to select a reduced charging set-point that is commensurate with the magnitude of the recovered electric power from regenerative braking. The routine 200 may further modify the charging setpoint by accounting for ambient considerations, such as ambient temperature, and its effect on charging. This may result in reduced charging time, and reduced attendant charging costs when the charging event is occurring at a public charging station.

Figure 3:
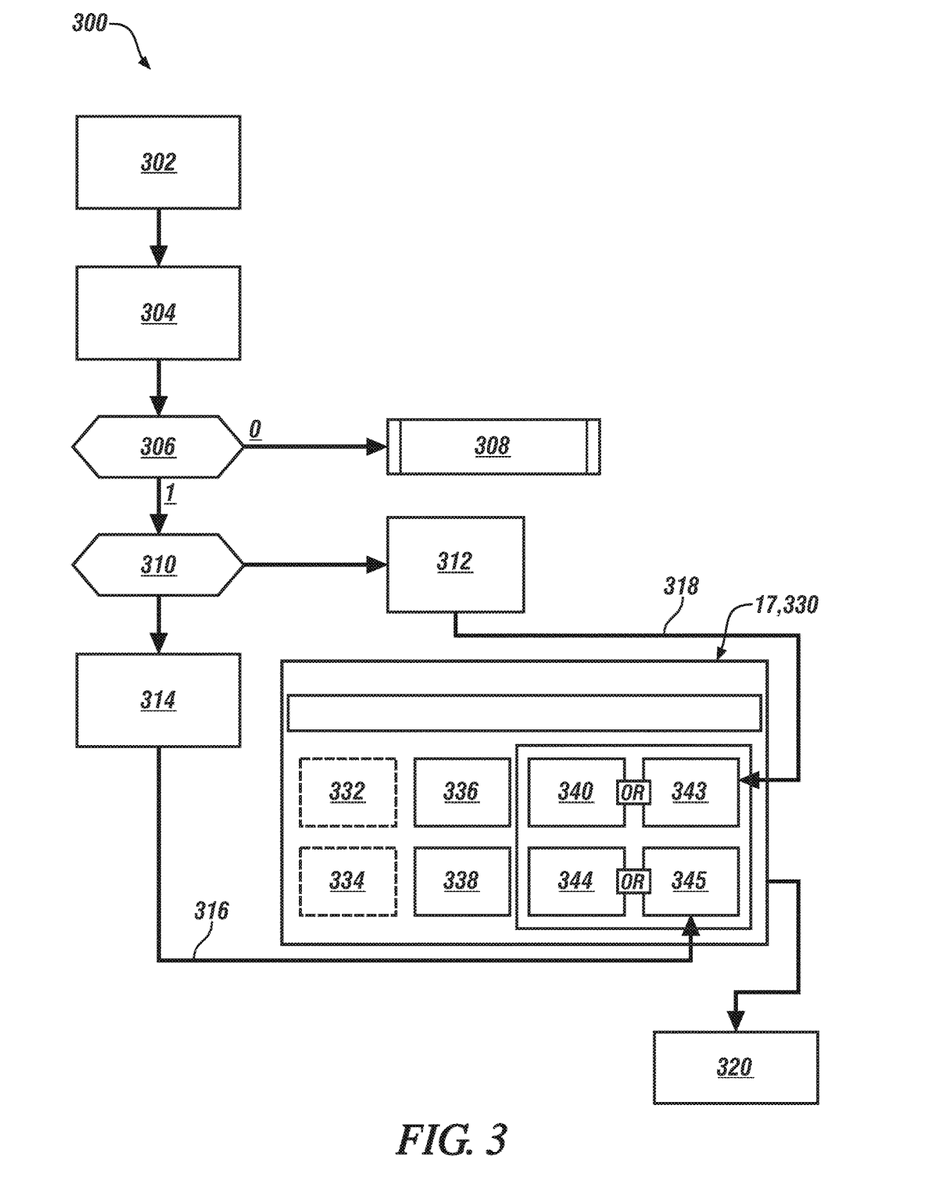

FIG. 3 schematically shows a second, alternative battery charging management routine (routine) 300 that may be executed to control a charging event on a vehicle that does not include an enhanced navigation system. One embodiment of such a vehicle is described with reference to FIG. 1. This routine 300 may be advantageously employed on various vehicle systems that employ high-voltage electrical systems to generate propulsion torque. The routine 300 may be applied to operation of any vehicle including an energy storage device and a powertrain system capable of regenerative braking operation. This may include a vehicle powertrain system that includes a non-combustion torque machine that consumes energy stored in an on-board energy storage device to generate propulsion torque, wherein the on-board energy storage device may be recharged during subsequent vehicle operation using opportunity charging such as regenerative braking, or recharged during vehicle operation using torque generated by another machine such as an internal combustion engine. Table 2 is provided as a key wherein the numerically labeled blocks and the corresponding functions are set forth as follows, corresponding to the routine 300.

TABLE 2

| BLOCK | BLOCK CONTENTS |
|---|---|
| 302 | Trip completed<br>Fully charge Battery<br>Determine vehicle location |
| 304 | Monitor battery, monitor energy recovery from regenerative braking |
| 306 | Monitor driving cycle for trip<br>Determine whether SOC saturation occurs |
| 308 | Maintain present charge SOC setpoint |
| 310 | Unlock lower charge SOC setpoint<br>Select fixed or variable SOC charge limit |
| 312 | Integrate lost opportunity charging SOC to adjust lower charge SOC setpoint |
| 314 | Unlock lower charge SOC setpoint for vehicle location |
| 316 | Determine fixed reduced SOC charge setpoint |
| 318 | Determine variable reduced SOC charge setpoint |
| 320 | Commence vehicle charging |

The routine 300 includes initially fully charging the battery 25 at a charging station after a completed trip and determining a geographic location of the vehicle 100 (302). The geographic location of the vehicle 100 may be determined based upon information related to location of the charging station, which may be determined based upon information other than that which would be available from an on-board navigation system. The present geographical location of the vehicle may be determined via operator input to the UI 17. An example display screen 330 on the UI 17 is shown, and includes operator-selectable elements related to vehicle location, e.g., location 1 (e.g., home) 332, location 2 (e.g., work) 334, time of date 1 (e.g., morning) 336, and time of date 2 (e.g., morning) 338. The example display screen 330 includes SOC charge setpoint options that include full charge setpoints 340, 344 and reduced charge setpoints 343, 345, wherein the reduced charge setpoints preferably include a fixed reduced charge setpoint 343 and a variable reduced charge setpoint 345. Access to the reduced charge setpoint option including the fixed reduced charge setpoint 343 and the variable reduced charge setpoint 345 may be locked under certain conditions, thus prohibiting the operator from selecting one of the reduced charge setpoints 343, 345.

The routine 300 monitors SOC of the battery 25 and magnitude of electric energy recuperation during an ensuing trip, such as from opportunity charging associated with regenerative braking or coastdown braking during the trip (304).

The routine 300 monitors the SOC of the battery 25 and related operating parameters to determine whether SOC saturation occurs during the trip, which may cause a constrained power limit that is associated with the SOC saturation (306). When there is no occurrence of SOC saturation during the trip (306)(0), the routine 300 determines that there was no power loss associated with missed opportunity charging and an expected increase in SOC due to regenerative braking, and maintains the charge setpoint for that geographic location of the vehicle 100 (308).

When there is one or more occurrences of SOC saturation during the trip (306)(1), the routine 300 determines that there was some power loss associated with missed opportunity charging and an increase in SOC due to regenerative braking, and unlocks the charge setpoint for that geographic location of the vehicle 100 (310). The routine 300 further selects either a fixed or variable SOC charge setpoint configuration.

When the routine 300 selects the fixed reduced SOC charge setpoint configuration (310)(0), the charge setpoint for the vehicle 100 may be unlocked at that geographic location (314). The fixed reduced SOC charge setpoint is selected from a predetermined charge setpoint associated with the specific geographic location, which may be specific to the geographic location without other considerations (316).

An updated version of the display 330 is depicted, and includes operator-selectable elements related to vehicle location, e.g., location 1 (e.g., home) 332, location 2 (e.g., work) 334, time of date 1 (e.g., morning) 336, and time of date 2 (e.g., morning) 338. The example display 330 includes charge setpoint options that include a full charge 340, 344 and a reduced charge setpoint, wherein the reduced charge setpoint may include either a fixed reduced charge setpoint 343 or a variable reduced charge setpoint 345. The reduced charge setpoint option including the fixed reduced charge setpoint 343 and the variable reduced charge setpoint 345 may be unlocked, thus permitting the operator to select one of the reduced charge setpoints 343, 345.

The fixed reduced SOC charge setpoint is input to the UI 17, and the vehicle operator is prompted via the UI 17 to select either the full charge setpoint 344 or the fixed reduced SOC charge setpoint 345.

Alternatively, the routine 300 selects the variable reduced SOC charge setpoint configuration (310)(1) and unlocks the charge setpoint for the vehicle 100 at that geographic location (318). The variable reduced SOC charge setpoint is selected from a predetermined charge setpoint associated with the operation of the vehicle during a previous trip, including lost opportunity charging. This is input to the UI 17, and the vehicle operator is prompted to select either the full charge setpoint 340 or the variable reduced SOC charge setpoint 343.

Vehicle charging commences after the vehicle operator makes a selection, with the charging based upon the selected one of the full SOC charge setpoint 340, 344, the fixed reduced SOC charge setpoint 345, or the variable reduced SOC charge setpoint 343. The magnitude of vehicle charging corresponds to the anticipated next trip of the vehicle as indicated by the operator (320).

The routine 300 employs information from various on-vehicle and off-vehicle systems, such as a navigation system, to decide whether to modify an SOC setpoint for a charging event prior to an anticipated next trip. The routine 300 evaluates a near-term probability of driving the vehicle on a downhill grade, e.g., as indicated by the operator or the navigation system, and estimates, using a vehicle forward model, whether the grade would result in saturating and/or overcharging of the battery 25, taking into consideration estimated accessory loads. If the routine 300 predicts a likelihood of saturation of the battery, the driver may have the option to select a reduced charging set-point that is commensurate with the magnitude of the recovered electric power from regenerative braking. The routine may further modify the charging setpoint by accounting for ambient considerations, such as ambient temperature, and its effect on charging. This may result in reduced charging time, and attendant charging costs when the charging event is occurring at a public charging station.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instructions to implement the function or act specified in the flowchart.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a vehicle including an energy storage device and a powertrain system including regenerative braking capability, the method comprising:
    determining an anticipated next trip of the vehicle;
    determining an expected increase in the state of charge achieved through opportunity charging of the energy storage device employing regenerative braking during the anticipated next trip of the vehicle;
    determining a desired setpoint for the state of charge of the energy storage device prior to the anticipated next trip of the vehicle based upon the expected increase in the state of charge achieved through the opportunity charging of the energy storage device during the anticipated next trip of the vehicle; and
    controlling charging of the energy storage device during a remote charging event prior to the anticipated next trip of the vehicle based upon the desired setpoint for the state of charge of the energy storage device.

2. The method of claim 1, further comprising:
    monitoring a state of charge of the energy storage device;
    controlling charging of the energy storage device during the remote charging event based upon the desired setpoint for the state of charge of the energy storage device and the state of charge of the energy storage device.

3. The method of claim 1, further comprising:
    determining an expected increase in the state of charge achieved through opportunity charging of the energy storage device employing regenerative braking during a portion of the anticipated next trip of the vehicle; and
    determining the desired setpoint for the state of charge of the energy storage device based upon the expected increase in the state of charge during the portion of the anticipated next trip of the vehicle.

4. The method of claim 1, wherein the vehicle further includes an on-board navigation system, and wherein determining the anticipated next trip of the vehicle comprises employing the on-board navigation system to determine expected route information for the anticipated next trip of the vehicle.

5. The method of claim 4, comprising employing the on-board navigation system to determine the expected route information for the anticipated next trip of the vehicle based upon a present location of the vehicle.

6. The method of claim 4, comprising:
    employing the on-board navigation system to determine a present geographical location of the vehicle and an expected route information for the anticipated next trip of the vehicle; and
    determining the expected increase in the state of charge achieved through opportunity charging of the energy storage device employing regenerative braking when traversing the expected route for the anticipated next trip of the vehicle.

7. The method of claim 1, wherein controlling charging of the energy storage device comprises controlling charging of the energy storage device based upon the desired setpoint for the state of charge of the energy storage device and the monitored state of charge of the energy storage device.

8. The method of claim 1, further comprising:
    determining an expected increase in the state of charge achieved through opportunity charging of the energy storage employing the regenerative braking of the powertrain system during a portion of an anticipated next trip of the vehicle; and
    determining the desired setpoint for the state of charge of the energy storage device based upon the expected increase in the state of charge achieved through opportunity charging of the energy storage device during the portion of the anticipated next trip of the vehicle.

* * * * *